Dec. 1, 1925.

E. S. MOBERLEY

PISTON RING

Filed Aug. 4, 1924

1,564,095

INVENTOR.

Edward. S. Moberley.

BY

Gerald J. Baldwin

ATTORNEY.

Patented Dec. 1, 1925.

1,564,095

UNITED STATES PATENT OFFICE.

EDWARD S. MOBERLEY, OF DETROIT, MICHIGAN.

PISTON RING.

Application filed August 4, 1924. Serial No. 730,007.

*To all whom it may concern:*

Be it known that I, EDWARD S. MOBERLEY, a citizen of the United States, residing at Detroit, in the county of Wayne and State of Michigan, have invented a new and useful Improvement in Piston Rings, of which the following is a specification.

My invention relates to improvements in piston rings, and has particular reference to rings employed in internal combustion engines, though their use is not restricted to this one purpose.

One of the objects of my invention is to provide a piston ring consisting of two laterally disposed sections of equal thickness, each having an outer side at right angles to their circumferences, and an inner side forming a contacting surface with the other section of the ring; each of the inner sides is partly bevelled and has one portion substantially parallel with its outer side to form a stop. The object of this is to eliminate telescoping which occurs when two laterally disposed ring sections are employed which have their contacting surfaces bevelled throughout their entire width. Telescoping is a fruitful source of jamming, unequal and excessive wall pressure, and broken rings. Moreover the partly bevelled sides insure the sections of the ring spreading laterally and compel them to occupy the full width of the groove.

Another object of the invention is to supply a piston ring construction in which any sudden inward pressure exerted on the outer circumference of the ring section nearest to the source of pressure will tend to force the other ring section outwards proportionately. In order to do this the section of the piston ring more directly exposed to sudden pressure from within the cylinder should be the one so shaped that the distance from its tapered side to its square side adapted to bear against one side wall of the piston groove is greater towards its outer circumference; and the complementary ring section should be on that side of the piston groove more remote from direct pressure influence within the cylinder.

It will be remembered that piston rings are generally used at least in pairs, so when my rings are used on a double-acting piston the ring sections should be so placed that those wider towards their outside diameters are towards the ends of the piston, and the sections narrower towards their outside diameters towards the centre of the piston. On single acting pistons, however many rings are used, the ring section having its greatest width towards its outside diameter should be placed on the side nearest which pressure from within the cylinder is exerted.

A further object of the invention is to provide a multi-sided spring within the piston groove and under both sections of the piston ring. This not only augments the resiliency of the ring sections, but is also used to engage the slots in both ring sections to hold the slots in spaced relation to one another. In this way the slots are positively prevented from registering with each other, which is a frequent cause of loss.

With these and other objects in view, my invention consists in certain novel construction and combination of parts hereinafter more fully described with the aid of the accompanying drawings and claimed.

Figure 2:
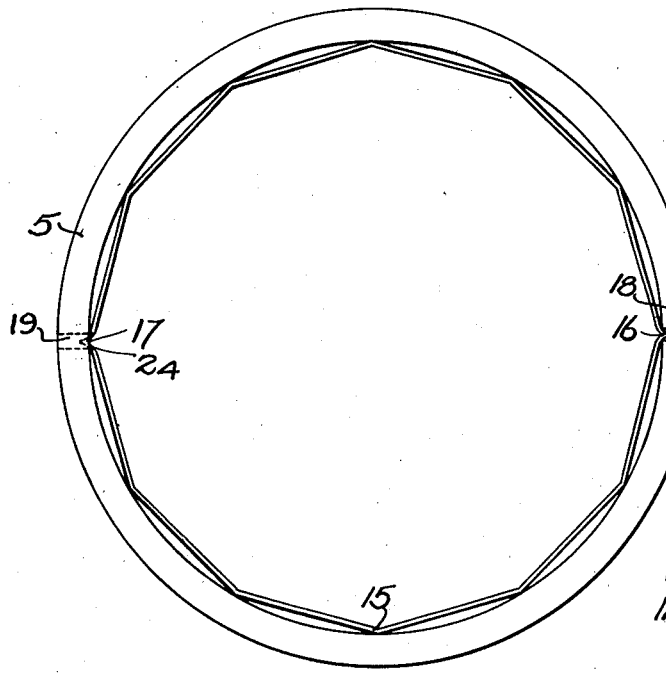
Figure 2 shows a side elevation of one of my rings with my multi-sided spring.
Figure 1:
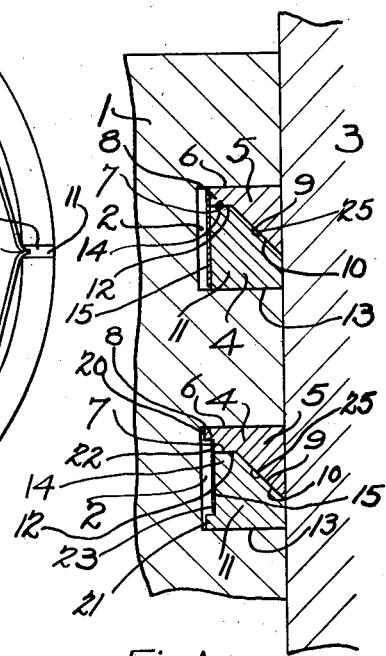
Figure 1 illustrates a sectional elevation showing two piston rings of slightly modified form on a piston.
Figure 3:
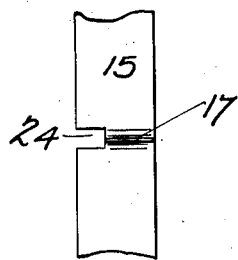
Figures 3 and 4 are details of the spring.
Figure 4:
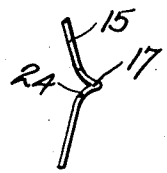

Referring more particularly to the drawing, 1 indicates a piston having ordinary grooves 2 and fitted in a cylinder 3. In each of the grooves 2 a ring 4 is arranged which consists of two sections 5 and 11, of equal thickness and normally adapted to bear against the wall of the cylinder 3. The section 5 has one side 6 at right angles to its outer and inner circumferences and adapted to bear against one side wall of the groove 2. Its other side has a portion 7, parallel with the side 6, which forms one side of the stop 8, and a bevelled surface 9 forming a continuation of the portion 7. The surface 9 contacts with the bevelled surface 10 of the section 11, and also terminates in a portion 12 parallel with the outer side 13, thereby forming one side of the stop 14 which registers with the stop 8. The outer side 13 of the section 11 rests against the other side wall of the groove 2.

Now as the section 5 of the ring is nearer to the top of the piston where sudden pressure is exerted within the cylinder, the direction of the bevelled surfaces 9 and 10 should be as shown, and assuming that the piston shown is a single action one the lower ring sections are arranged similarly to the ring sections in the upper groove; if, however, the piston were a double acting one having two rings, the ring sections in the lower groove would have to be reversed. In other words the ring section widest towards its outside diameter, namely section 5, should be on the side of the groove nearest the end of the piston from which sudden internal pressure in the cylinder is expected. The reason for this is that any inward and downward pressure exerted on the outer section 5 will force the section 11 downwards and outwards. The stop 8 which registers with the stop 14 prevents the two ring sections telescoping each other.

The spring 15, which bears against and extends entirely around the inner circumference of both the sections 5 and 11 tends to supplement the resiliency of the rings themselves and to maintain the ring sections concentric with the base of the groove 2. From Figure 2 it will also be noted that the spring is multi-sided and is supplied with angular protrusions 16 and 17, each of which extend only partway across the width of the spring leaving a gap 24, so that one protrusion 16 may engage the slot 18 in the ring section 5, and the other protrusion 17 the slot 19 in the section 11. In this way I hold the two slots in spaced relation to each other.

The spring 15 may either bear against the inner circumference 20 and 21 of the ring sections 5 and 11, or the latter may be supplied with recesses 22 and 23 to receive the spring. My object in providing these recesses is to supply clearance between the bottom of the groove 2 and the bearing surface for my multi-sided spring 15, because whereas the base of the groove 2 and the bearing surfaces of the recesses 22 and 23, or the inner circumferences 20 and 21, are circular, the sides of the spring are not; so that when recesses are supplied the clearance otherwise necessary between the bottom of the ring groove 2 and the base of the ring sections can be eliminated. But whether the ring sections are recessed or not the spring must bear against both sections.

The annular oil groove 25 is provided preferably in the bevelled surface 10, to maintain an oil film between the contacting surfaces 9 and 10 of the two ring sections 5 and 11.

Though in the foregoing the ring sections have been described and shown with their stops adjacent to their inner circumferences, just as satisfactory results may be obtained by locating the stops adjacent to the outer circumferences of the ring sections.

Having thus described my invention what I claim is:

1. A piston ring consisting of two split sections of equal thickness and arranged laterally to each other, each section having an outer side at right angles to its outer and inner circumferences, and an inner side bevelled and extending from one circumference and terminating in a portion contiguous to its other circumference substantially parallel to its outer side, thereby forming a stop, said stops and said bevelled sides being adapted to contact with each other, in combination with a multi-sided spring arranged within the inner circumference of and exerting an outward pressure on both of said ring sections, and an annular oil groove in the bevelled face of one of the ring sections.

2. A piston ring consisting of two split sections of equal thickness and arranged laterally to one another, each section having one side at right angles to its outer and inner circumferences, and an inner side bevelled through part of its cross section and terminating in a portion contiguous to one of its circumferences which is substantially parallel with its outer side thereby forming a stop, both of said stops and said bevelled surfaces being adapted to contact with each other, the ring section having its greatest width towards its outer circumference being adapted to rest in the side of the piston groove nearest the end of the piston from which sudden pressure within the cylinder is expected, in combination with a multi-sided spring having two angular protrusions adapted to engage slots in the ring sections, each angular protrusion extending only over that portion of the spring opposite the ring section the slot in which that protrusion is intended to engage, and an oil groove in the bevelled face of the ring section more remote from the end of the piston from which sudden pressure within the cylinder is exerted.

EDWARD S. MOBERLEY.